(12) United States Patent
Zhao

(10) Patent No.: US 10,606,721 B2
(45) Date of Patent: Mar. 31, 2020

(54) METHOD AND TERMINAL DEVICE FOR TESTING PERFORMANCE OF GPU, AND COMPUTER READABLE STORAGE MEDIUM

(71) Applicant: ZHUHAI JUNTIAN ELECTRONIC TECHNOLOGY CO., LTD., Zhuhai (CN)

(72) Inventor: Kun Zhao, Beijing (CN)

(73) Assignee: ZHUHAI JUNTIAN ELECTRONIC TECHNOLOGY CO., LTD., Zhuhai (CN)

(*) Notice: Subject to any disclaimer, the term of this patent is extended or adjusted under 35 U.S.C. 154(b) by 47 days.

(21) Appl. No.: 16/015,632

(22) Filed: Jun. 22, 2018

(65) Prior Publication Data

US 2019/0205231 A1    Jul. 4, 2019

(30) Foreign Application Priority Data

Dec. 29, 2017 (CN) .......................... 2017 1 1489476

(51) Int. Cl.
*G06F 11/22* (2006.01)
*G06T 1/20* (2006.01)
(Continued)

(52) U.S. Cl.
CPC ...... *G06F 11/2236* (2013.01); *G06F 11/3024* (2013.01); *G06F 11/3409* (2013.01); *G06T 1/20* (2013.01)

(58) Field of Classification Search
CPC ....................................................... G06F 11/34
(Continued)

(56) References Cited

U.S. PATENT DOCUMENTS 7,882,369 B1 * 2/2011 Kelleher ............... G06F 1/3203
713/300
9,473,758 B1 * 10/2016 Long ..................... A63F 13/497
(Continued)

OTHER PUBLICATIONS

"Static Cost Estimation for Data Layout Selection on GPUs" Yuhan Peng at el. 2016 7th International Workshop on Performance Modeling, Benchmarking and Simulation of High Performance Computer Systems.*
(Continued)

*Primary Examiner* — Javid A Amini
(74) *Attorney, Agent, or Firm* — Osha Liang LLP

(57) ABSTRACT

Embodiments of the present disclosure provide a method for testing performance of GPU, a terminal device and a storage medium. The method comprises: capturing a target scene from a 3D scene model by a main camera in the 3D scene model; determining an execution sequence of functions in a script object of the target object and determining a target rendering process according to the execution sequence; obtaining a target image via the target rendering process, and incrementing a rendering execution number i by 1; moving the main camera, capturing a new scene to update the target scene and iterating the above steps until i is equal to j; obtaining a time period T for completing j target rendering processes, and determining a target performance parameter according to j and T; and determining a performance test result of the GPU according to the target performance parameter and a performance criterion parameter.

20 Claims, 4 Drawing Sheets

(51) Int. Cl.
*G06F 11/30* (2006.01)
*G06F 11/34* (2006.01)

(58) Field of Classification Search
USPC .......................................... 345/522
See application file for complete search history.

(56) References Cited

U.S. PATENT DOCUMENTS

| | | | | |
|---|---|---|---|---|
| 10,033,656 B2* | 7/2018 | Kravchik | .............. | G06F 16/958 |
| 10,108,850 B1* | 10/2018 | Das | .................... | G06K 9/00885 |
| 2010/0211933 A1* | 8/2010 | Kiel | .................... | G06F 11/3636 |
| | | | | 717/125 |
| 2012/0221573 A1* | 8/2012 | Wunsch, II | ............ | G16B 40/00 |
| | | | | 707/737 |
| 2012/0310370 A1* | 12/2012 | Huang | ............... | A61B 5/04888 |
| | | | | 623/25 |
| 2014/0095571 A1* | 4/2014 | Bates | ................ | G06F 7/4833 |
| | | | | 708/524 |
| 2015/0160970 A1* | 6/2015 | Nugteren | ................ | G06F 8/451 |
| | | | | 718/102 |
| 2015/0201176 A1* | 7/2015 | Graziosi | .............. | H04N 13/111 |
| | | | | 348/43 |
| 2015/0324441 A1* | 11/2015 | Zhou | ......................... | G06T 1/20 |
| | | | | 707/737 |
| 2015/0324707 A1* | 11/2015 | Zhou | .................. | G06F 11/3409 |
| | | | | 717/124 |
| 2015/0346970 A1* | 12/2015 | Holland | ................ | G06F 21/629 |
| | | | | 715/765 |
| 2016/0055608 A1* | 2/2016 | Frascati | .................. | G06F 9/451 |
| | | | | 345/522 |
| 2016/0232707 A1* | 8/2016 | Han | ...................... | G06T 15/506 |
| 2016/0321381 A1* | 11/2016 | English | ............... | G06F 17/5009 |
| 2016/0344649 A1* | 11/2016 | Kravchik | .............. | G06F 16/958 |
| 2017/0084068 A1* | 3/2017 | Son | .................... | G06K 9/00208 |
| 2017/0148433 A1* | 5/2017 | Catanzaro | ............... | G10L 25/18 |
| 2017/0301111 A1* | 10/2017 | Zhao | .................... | G01C 25/005 |
| 2017/0330496 A1* | 11/2017 | Oravainen | ............ | A63F 13/211 |
| 2017/0344093 A1* | 11/2017 | Ting | .......................... | G06F 1/28 |
| 2017/0344514 A1* | 11/2017 | Zhou | ...................... | G06F 17/16 |
| 2017/0372447 A1* | 12/2017 | Zhou | ......................... | G06T 1/60 |
| 2018/0129969 A1* | 5/2018 | Feng | ...................... | G06N 20/00 |
| 2018/0150969 A1* | 5/2018 | Niwayama | ................ | G06T 7/62 |
| 2018/0293437 A1* | 10/2018 | Dempsey | ........... | G06K 9/00463 |
| 2018/0332252 A1* | 11/2018 | Wang | ..................... | G09G 5/005 |
| 2019/0096035 A1* | 3/2019 | Li | .......................... | G06T 3/4053 |
| 2019/0206023 A1* | 7/2019 | Dimitrov | .................. | G06T 1/60 |
| 2019/0259194 A1* | 8/2019 | Ford | .................... | G06T 15/005 |

OTHER PUBLICATIONS

"A Quantitative Performance Analysis Model for GPU Architectures" Yao Zhang and John D. Owens, 2011 IEEE.*

* cited by examiner

METHOD AND TERMINAL DEVICE FOR TESTING PERFORMANCE OF GPU, AND COMPUTER READABLE STORAGE MEDIUM

CROSS-REFERENCE TO RELATED APPLICATIONS

This application is based on and claims a priority to Chinese Patent Application No. 201711489476.6, filed on Dec. 29, 2017, the entire contents of which are incorporated herein by reference.

FIELD

The present disclosure relates to the computer technology field, and more particularly to a method for testing performance of a graphics processing unit (GPU), a terminal device for testing performance of GPU and a computer readable storage medium.

BACKGROUND

With development of science and technology, performance of GPU of a terminal device is improved rapidly. Further, the GPU can deal with various tasks with improvement of the technology, which causes performance differences of the GPU.

In related art, there is no complete and reliable method for accurately testing performance of the GPUs with different architectures.

DISCLOSURE

The present disclosure provides a method for testing performance of GPU, a terminal device for testing performance of GPU and a computer readable storage medium, which can improve accuracy of testing performance of the GPU of a terminal device and improve applicability of performance test for the GPU.

A first aspect of embodiments of the present disclosure provides a method for testing performance of GPU, including: capturing a target scene from a 3D scene model by a main camera in the 3D scene model and extracting a target object from the target scene, in which the target scene is selected from scenes included in the 3D scene model; determining an execution sequence of a plurality of functions included in a script object of the target object and determining a target rendering process according to the execution sequence, in which the plurality of functions correspond respectively to sub processes in the target rendering process; driving the GPU to execute the target rendering process, rendering the target scene onto a target map by means of the target rendering process to obtain a target image corresponding to the target scene, and incrementing a rendering execution number i by 1 once the target rendering process is completed by the GPU, in which an initial value of i is 0; moving the main camera, and iterating steps of capturing, extracting, determining, driving, rendering and incrementing until i is equal to a predetermined threshold j, where j is an integer greater than 1; when i is equal to the predetermined threshold j, obtaining a time period T required by the GPU for completing j target rendering processes, and determining a target performance parameter according to j and T; and determining a performance test result of the GPU according to the target performance parameter and a performance criterion parameter.

A second aspect of embodiments of the present disclosure provides a terminal device for testing performance of GPU, including: a capturing unit, a rendering unit, a performance parameter determining unit and a test result determining unit. The capturing unit is configured to capture a target scene from a 3D scene model by a main camera in the 3D scene model and to extract a target object from the target scene, in which the target scene is selected from scenes included in the 3D scene model. The rendering unit is configured to determine an execution sequence of a plurality of functions included in a script object of the target object extracted by the capturing unit and to determine a target rendering process according to the execution sequence, in which the plurality of functions correspond respectively to sub processes in the target rendering process. The rendering unit is further configured to drive the GPU to execute the target rendering process, to render the target scene onto a target map by means of the target rendering process to obtain a target image corresponding to the target scene, and to increment a rendering execution number i by 1 once the target rendering process is completed by the GPU, wherein an initial value of i is 0. The rendering unit is further configured to move the main camera initialized by an initialized unit, and to drive the capturing unit and the rendering unit to work until i is equal to a predetermined threshold j, where j is an integer greater than 1. The performance parameter determining unit is configured to, when i obtained by the rendering unit is equal to the predetermined threshold j, obtain a time period T required by the GPU for completing j target rendering processes, and to determine a target performance parameter according to j and T. The test result determining unit is configured to determine a performance test result of the GPU according to the target performance parameter and a performance criterion parameter.

A third aspect of embodiments of the present disclosure provides a terminal device. The terminal device includes a processor, an input device, an output device and a memory. The processor, the input device, the output device and the memory are coupled to each other. The memory is configured to a computer program including program commands. The processor is configured to invoke the program commands to perform the method according to the first aspect of embodiments of the present disclosure.

A fourth aspect of embodiments of the present disclosure provides a non-transitory computer-readable storage medium having stored therein a computer program including program commands that, when executed by a processor of a device, causes the processor to perform the method according to the first aspect of embodiments of the present disclosure.

A fifth aspect of embodiments of the present disclosure provides a computer program. The computer program includes program commands that, when executed by a processor of a device, causes the processor to perform the method according to the first aspect of embodiments of the present disclosure.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings

EMBODIMENTS OF THE PRESENT DISCLOSURE

Clear and complete descriptions will be made to technical solutions of embodiments of the present disclosure with reference to drawings of embodiments of the present disclosure. Obviously, the described embodiments are merely parts of embodiments instead of all embodiments of the present disclosure. Based on the embodiments illustrated in the present disclosure, other embodiments obtained by those skilled in the art without any inventive labor are all covered by the scope of the present disclosure.

It should be further understood that, when used in the specification, terms "comprising" and/or "containing" specify the presence of stated features, operations, elements and/or components, but do not exclude the presence or addition of one or more other features, operations, elements, components and/or groups thereof.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise.

It should also be understood that, as used herein, the term "and/or" represents and contains any one and all possible combinations of one or more associated listed items.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Figure 1:
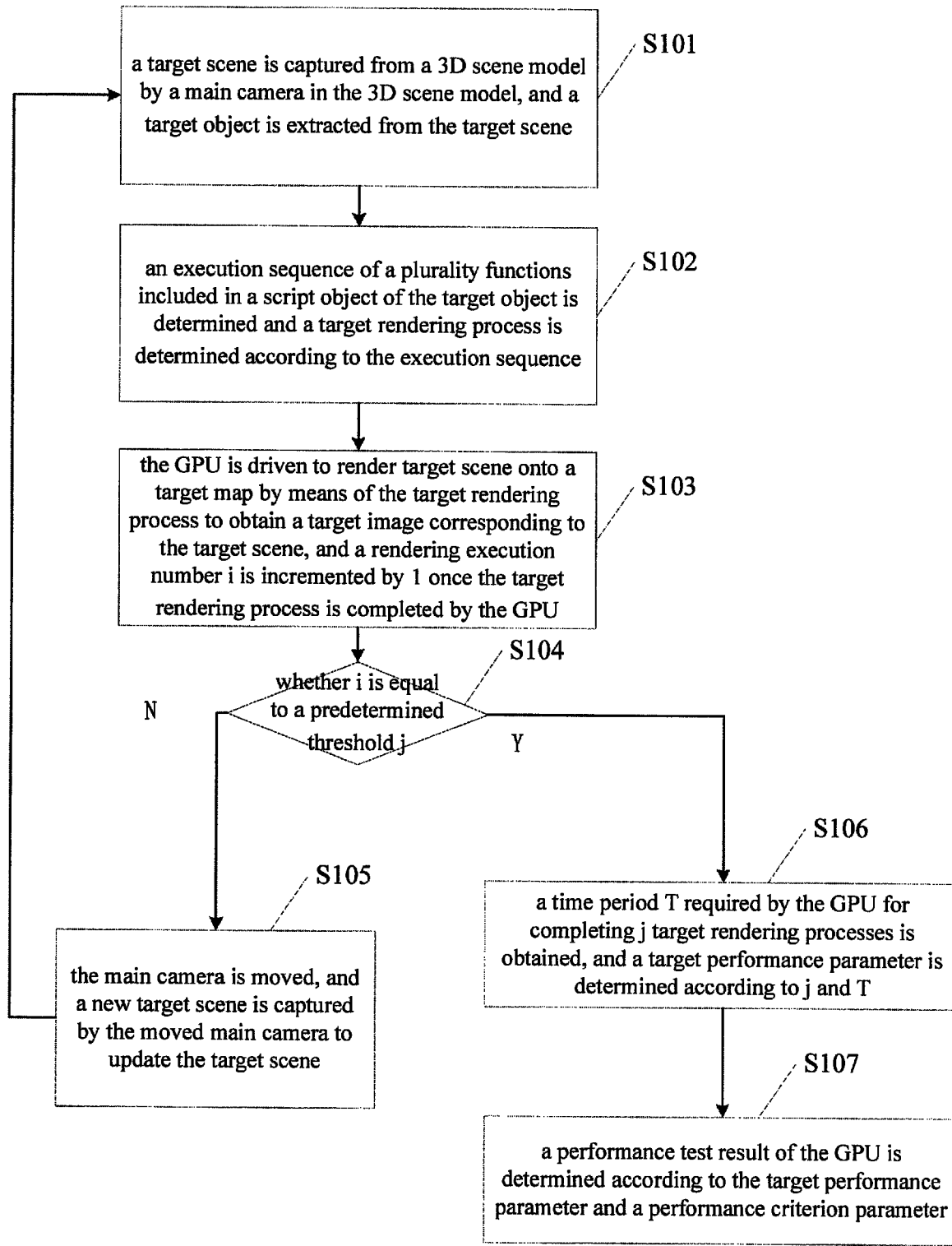
FIG. 1 is a flow chart of a method for testing performance of GPU according to a first embodiment of the present disclosure.

Referring to FIG. 1, FIG. 1 is a flow chart of a method for testing performance of GPU according to a first embodiment of the present disclosure. In the following, the method will be described by using a terminal device as an execution subject. The method may include followings.

At block 101, a target scene is captured from a 3D scene model by a main camera in the 3D scene model, and a target object is extracted from the target scene.

In some possible implementations, before capturing the target scene from the 3D scene model by the main camera in the 3D scene model, the terminal device needs to obtain a 3D scene in advance. In one embodiment, the terminal device can use a game engine such as Unity 3D to actively establish and edit the 3D scene model which can be used in a subsequent GPU performance test. In one embodiment, the terminal device may also obtain an established 3D scene model from a predetermined 3D model library. After the terminal device obtains the 3D scene model, the main camera can be extracted from the 3D scene model. The main camera can capture a part of 3D scene from the 3D scene model as the target scene with a predetermined cone of vision. After the main camera is extracted, the main camera is initialized using predetermined camera configuration parameters. For example, a target texture of the main camera is set as a texture type determined in the predetermined camera configuration parameters. After the terminal device initializes the main camera, the target scene can be captured from the 3D scene model by the main camera. Then, the terminal device may list the target object included in the target scene. The target object includes a script object, a particle system object, an animation object and a navigation data object included in the target scene.

At block S102, an execution sequence of a plurality functions included in a script object of the target object is determined and a target rendering process is determined according to the execution sequence.

In some possible implementations, there may be one or more script objects. Each script object includes functions such as FixedUpdate, Update or the like. The plurality of functions correspond respectively to sub processes in the target rendering process. For example, the function Update corresponds to a picture logic processing sub process in the target rendering process. After the terminal device obtains a plurality of script objects included in the target scene, the execution sequence of the plurality functions included in each script object can be determined. For example, after the function FixedUpdate in each script object is executed, the function Update will be executed. After the terminal device determines the execution sequence of the plurality of functions included in each script object, the plurality of functions are executed, and the particle system object, the animation object and the navigation data object are invoked, such that the target rendering process can be determined.

At block S103, the target scene is rendered onto a target map by means of the target rendering process to obtain a target image corresponding to the target scene, and a rendering execution number i is incremented by 1 once the target rendering process is completed by the GPU.

In some possible implementations, after the terminal device determines the target rendering process, the GPU is driven to render the target scene onto the target map by means of the target rendering process. In detail, the terminal device may drive the GPU to determine an effect of a predetermined light source in the target scene on an object. The GPU may specify shadow setting for the object by using Depth Map Shadow method or Ray Tracing Shadow method. Then, the GPU needs to determine a surface color of the object according to material of the object. At last, the GPU determines effects corresponding to the particle system object and animation object included in the target object, and draws 2D image onto the target map to obtain the target image corresponding to the target scene. After the terminal device drives the GPU to obtain the target image, the rendering execution number i is incremented by 1.

At block S104, it is determined whether i is equal to a predetermined threshold j, if no, an act at block S105 is executed, if yes, an act at block S106 is executed, where j is an integer greater than 1.

At block S105, the main camera is moved, and a new target scene is captured by the moved main camera to update the target scene and the procedure returns to block S101.

In some possible implementations, when the terminal device determines that the rendering execution number i is less than j, the main camera included in the 3D scene model is moved according to a navigation object included in the target object. The movement of the main camera may include rotation movement, linear movement, which is not limited herein. After the main camera is moved, the captured scene may change. In this case, the terminal device may set the scene captured by the moved main camera as an updated target scene. After the target scene is updated by the terminal device using the moved main camera, acts at block S101-S104 are executed again.

At block S106, a time period T required by the GPU for completing j target rendering processes is obtained, and a target performance parameter is determined according to j and T.

In some possible implementations, when the terminal device determines that i is equal to j, the time period T required by the GPU for completing j target rendering processes is obtained. The time period T indicates a time interval from initial time t0 when the GPU is driven by the terminal device to execute $1^{st}$ target rendering process to time t3 when the GPU completes j target rendering processes. After the terminal device obtains the time period T, a parameter j/T may be determined as the target performance parameter of the GPU.

At block S107, a performance test result of the GPU is determined according to the target performance parameter and a performance criterion parameter.

In some possible implementations, after the terminal device determines the target performance parameter of the GPU, a predetermined performance criterion parameter is obtained.

The performance criterion parameter may be performance criterion empirical value obtained through many times of GPU performance tests. When the terminal device determines that the target performance parameter is less than the performance criterion parameter, it can be determined that the GPU has low performance. When the terminal device determines that the target performance parameter is greater than or equal to the performance criterion parameter, it can be determined that the GPU has high performance.

In embodiments of the present disclosure, a target scene is captured from a 3D scene model by a main camera in the 3D scene model and a target object is extracted from the target scene. The target scene is selected from scenes included in the 3D scene model. The target object is selected from objects included in the target scene captured by the main camera. An execution sequence of a plurality of functions included in a script object of the target object is determined and a target rendering process is determined according to the execution sequence. The plurality of functions correspond respectively to sub processes in the target rendering process. The target scene is rendered onto a target map by means of the target rendering process to obtain a target image corresponding to the target scene, and a rendering execution number i is incremented by 1 once the target rendering process is completed by the GPU. The main camera is moved. Then, the steps of capturing, extracting, determining, driving, rendering and incrementing are iterated until i is equal to a predetermined threshold j. When i is equal to the predetermined threshold j, the time period T required by the GPU for completing j target rendering processes is obtained, and a target performance parameter is determined according to j and T. A performance test result of the GPU is determined according to the target performance parameter and a performance criterion parameter. With the embodiments of the present disclosure, the precision of method for testing performance of GPU can be improved, and the applicability of method for testing performance of GPU can be enhanced.

Figure 2:
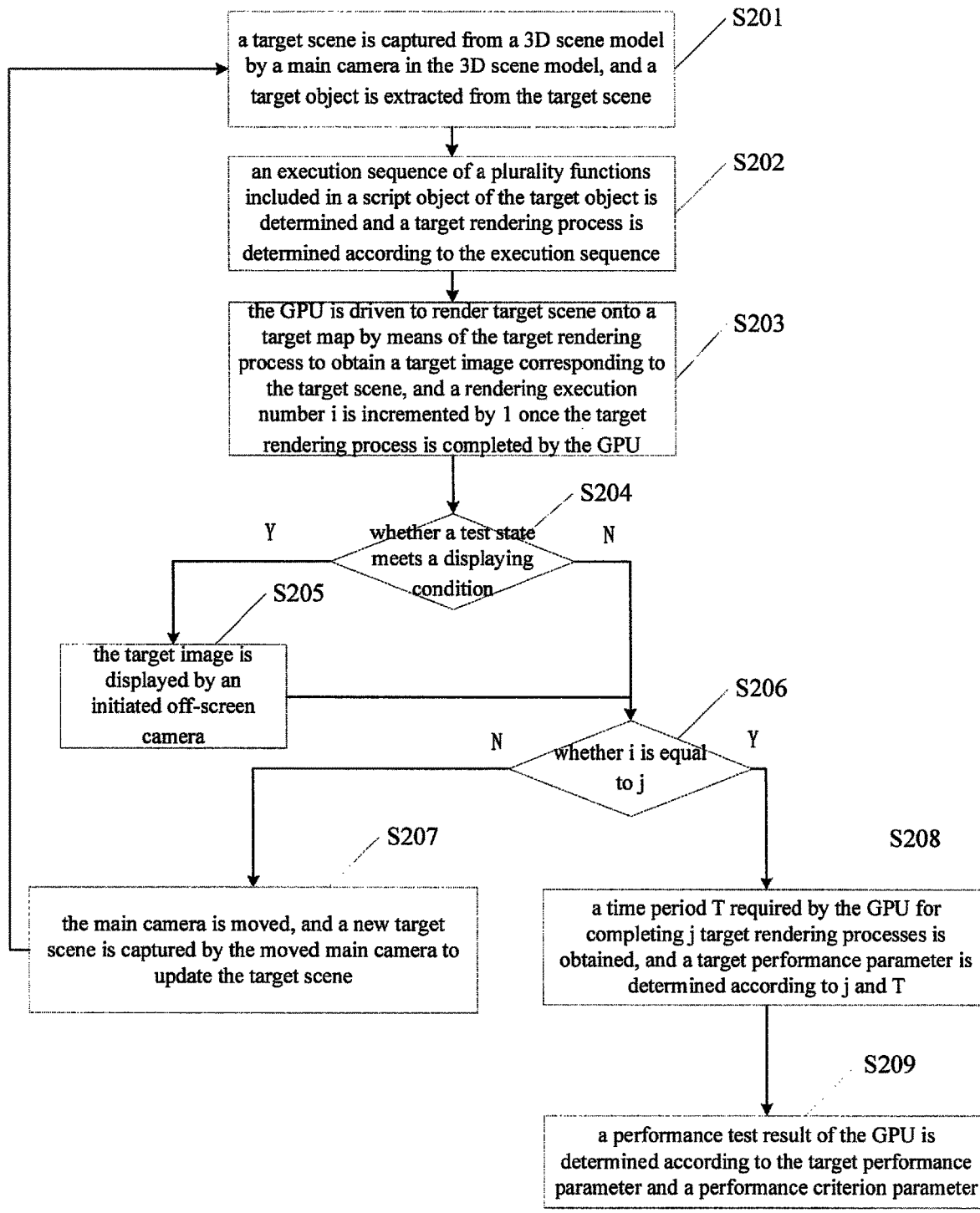
FIG. 2 is a flow chart of a method for testing performance of GPU according to a second embodiment of the present disclosure.

Referring to FIG. 2, FIG. 2 is a flow chart of a method for testing performance of GPU according to a second embodiment of the present disclosure. In the following, the method will be described by using a terminal device as an execution subject. The method may include followings.

At block 201, a target scene is captured from a 3D scene model by a main camera in the 3D scene model, and a target object is extracted from the target scene.

In some possible implementations, before capturing the target scene from the 3D scene model by the main camera in the 3D scene model, the terminal device needs to obtain a 3D scene in advance. In one embodiment, the terminal device can use a game engine such as Unity 3D to actively establish and edit the 3D scene model which can be used in a subsequent GPU performance test. In one embodiment, the terminal device may also obtain an established 3D scene model from a predetermined 3D model library. After the terminal device obtains the 3D scene model, the main camera can be extracted from the 3D scene model. The main camera can capture a part of 3D scene from the 3D scene model with a predetermined cone of vision. After the main camera is extracted, the main camera is initialized using predetermined camera configuration parameters. For example, a target texture of the main camera is set as a texture type determined in the predetermined camera configuration parameters. After the terminal device initializes the main camera, the target scene can be captured from the 3D scene model by the main camera. Then, the terminal device may list the scene object (i.e., target object) included in the target scene. The scene object includes a script object, a particle system object, an animation object and a navigation data object included in the target scene.

At block S202, an execution sequence of a plurality of functions included in a script object of the target object is determined and a target rendering process is determined according to the execution sequence.

In some possible implementations, there may be one or more script objects. Each script object includes functions such as FixedUpdate, Update or the like. The plurality of functions correspond respectively to sub processes in the target rendering process. For example, the function Update corresponds to a picture logic processing sub process in the target rendering process. After the terminal device obtains a plurality of script objects included in the target scene, the execution sequence of the plurality functions included in each script object can be determined. For example, after the function FixedUpdate in each script object is executed, the function Update will be executed. After the terminal device determines the execution sequence of the plurality of functions included in each script object, the plurality of functions are executed, and the particle system object, the animation object and the navigation data object are invoked, such that the target rendering process can be determined.

At block S203, the target scene is rendered onto a target map by means of the target rendering process to obtain a target image corresponding to the target scene, and a rendering execution number i is incremented by 1 once the target rendering process is completed by the GPU.

In some possible implementations, after the terminal device determines the target rendering process, the GPU is driven to render the target scene onto the target map by means of the target rendering process. In detail, the terminal device may drive the GPU to determine an effect of a predetermined light source in the target scene on an object. The GPU may specify shadow setting for the object by using Depth Map Shadow method or Ray Tracing Shadow method. Then, the GPU needs to determine a surface color of the object according to material of the object. At last, the GPU determines effects corresponding to the particle system object and animation object included in the target object, and draws 2D image onto the target map to obtain the target image corresponding to the target scene. After the terminal device drives the GPU to obtain the target image, the rendering execution number i is incremented by 1.

At block S204, it is determined whether a test state meets a displaying condition, if yes, an act at block S205 is executed, if no, an act at block S206 is executed.

At block S205, the target image is displayed by an initiated off-screen camera.

In some possible implementations, after the terminal device drives the GPU to complete the target rendering process, it may be determined whether the current test state meets the displaying condition. In detail, the terminal device extracts the off-screen camera in the 3D scene model, and initializes the off-screen camera according to a predetermined off-screen map. Then, the terminal device may determine whether the rendering execution number i is equal to N*k, where k is a positive integer and N is a positive integer. When the terminal device determines that i is equal to N*k, it may be determined whether a time interval between the latest displaying time and time t1 when the GPU completes N*k target rendering processes is greater than a predetermined time interval, if yes, the target image obtained by means of the target rendering process is drawn onto the off-screen map to obtained a drawn off-screen map. In one embodiment, the terminal device may divide the off-screen map into K sub maps. After the target image is obtained by means of the target rendering process, the target image is drawn onto target sub maps in the K sub maps according to a present order to obtain the drawn off-screen map. At last, the drawn off-screen map is displayed onto a user interface of the terminal device by the initialized off-screen camera and an act at block S206 is executed. Meanwhile, the current time is set as t3 and the latest displaying time T' is updated as t3. T' represents the latest time when a drawn off-screen map is displayed on a user interface before the time t1. When the terminal device determines that i is less than N*k, the act at block S206 is executed.

At block S206, it is determined whether i is equal to j, if no, an act at block S207 is executed, if yes, an act at block S208 is executed.

At block S207, the main camera is moved, and a new target scene is captured by the moved main camera to update the target scene and the procedure returns to block S201.

In some possible implementations, the terminal device determines whether the rendering execution number i is equal to j. When the terminal device determines that the rendering execution number i is less than j, the main camera in the 3D scene model is moved according to the navigation data object included in the scene object. Then the terminal device uses the moved main camera to capture a new scene from the 3D scene model and updates the target scene using the new scene. In one embodiment, a fixed time threshold can be set, once the fixed time threshold is met, the main camera in the 3D scene model is moved to update the target scene. By moving the main camera at fixed time intervals, when the performance test is for different GPUs, the different GPUs may render the same target scene, such that different GPUs may be tested under the same testing environment. When the terminal device moves the main camera to update the target scene, the procedure returns to block S201.

At block S208, a time period T required by the GPU for completing j target rendering processes is obtained, and a target performance parameter is determined according to j and T.

In some possible implementations, when the terminal device determines that i is equal to j, the time period T required by the GPU for completing j target rendering processes is obtained. The time period T indicates a time interval from initial time t0 when the GPU is driven by the terminal device to execute $1^{st}$ target rendering process to time t3 when the GPU completes j target rendering processes. After the terminal device obtains the time period T, a parameter j/T may be determined as the target performance parameter of the GPU. In one embodiment, after obtaining the time period T, the terminal device may detect whether the GPU supports a predetermined special effect. The predetermined special effect includes Fog special effect, DOF special effect or SSAO special effect, which is not limited herein. When the terminal device determines that the GPU supports the predetermined special effect, the parameter j/T may be determined as the target performance parameter of the GPU. When the terminal device determines that the GPU does not support the predetermined special effect, a parameter a*j/T may be determined as the target performance parameter of the GPU, where a represents a penalty coefficient corresponding to the predetermined special effect. The penalty coefficient is obtained by performing several performance tests on the current dominant GPU, and is a ratio of a performance parameter b with the predetermined special effect to a performance parameter c without the predetermined special effect, i.e., a=b/c.

At block S209, a performance test result of the GPU is determined according to the target performance parameter and a performance criterion parameter.

In some possible implementations, after the terminal device determines the target performance parameter of the GPU, a predetermined performance criterion parameter is obtained.

The performance criterion parameter may be performance criterion empirical value obtained through many times of GPU performance tests. When the terminal device determines that the target performance parameter is less than the performance criterion parameter, it can be determined that the GPU has low performance. When the terminal device determines that the target performance parameter is greater than or equal to the performance criterion parameter, it can be determined that the GPU has high performance.

In embodiments of the present disclosure, a target scene is captured from a 3D scene model by a main camera in the 3D scene model and a target object is extracted from the target scene. The target scene is selected from scenes included in the 3D scene model. The target object is selected from objects included in the target scene captured by the main camera. An execution sequence of a plurality of functions included in a script object of the target object is determined and a target rendering process is determined according to the execution sequence. The plurality of functions correspond respectively to sub processes in the target rendering process. The target scene is rendered onto a target map by means of the target rendering process to obtain a target image corresponding to the target scene, and a rendering execution number i is incremented by 1 once the target rendering process is completed by the GPU. The main camera is moved. Then, the steps of capturing, extracting, determining, driving, rendering and incrementing are iterated until i is equal to a predetermined threshold j. When i is equal to the predetermined threshold j, the time period T required by the GPU for completing j target rendering processes is obtained, and a target performance parameter is determined according to j and T. A performance test result of the GPU is determined according to the target performance parameter and a performance criterion parameter. With the embodiments of the present disclosure, the precision of method for testing performance of GPU can be improved, and the applicability of method for testing performance of GPU can be enhanced.

Figure 3:
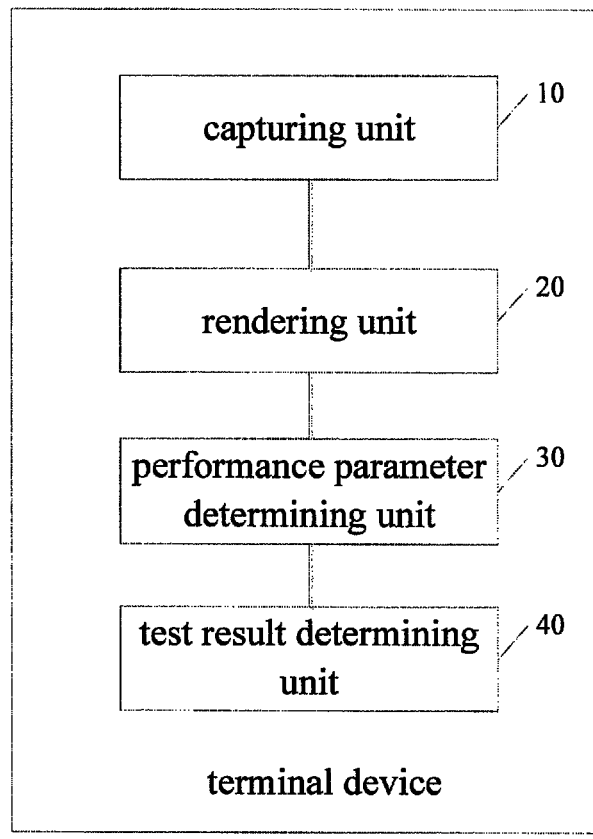
FIG. 3 is a block diagram of a terminal device for testing performance of GPU according to an embodiment of the present disclosure.

Referring to FIG. 3, FIG. 3 is a block diagram of a terminal device for testing performance of GPU according to an embodiment of the present disclosure. As illustrated in FIG. 3, the terminal device includes a capturing unit 10, a rendering unit 20, a performance parameter determining unit 30 and a test result determining unit 40.

The capturing unit 10 is configured to capture a target scene from a 3D scene model by a main camera in the 3D scene model and to extract a target object from the target scene. The target scene is selected from scenes included in the 3D scene model.

The rendering unit 20 is configured to determine an execution sequence of a plurality of functions included in a script object of the target object extracted by the capturing unit 10 and to determine a target rendering process according to the execution sequence. The plurality of functions correspond respectively to sub processes in the target rendering process.

The rendering unit 20 is configured to drive the GPU to execute the target rendering process, to render the target scene onto a target map by means of the target rendering process to obtain a target image corresponding to the target scene, and to increment a rendering execution number i by 1 once the target rendering process is completed by the GPU. An initial value of i is 0.

The rendering unit 20 is further configured to move the main camera initialized by an initialized unit, and to drive the capturing unit and the rendering unit to work until i is equal to a predetermined threshold j, where j is an integer greater than 1.

The performance parameter determining unit 30 is configured to, when i which is obtained by the rendering unit 20 is equal to the predetermined threshold j, obtain a time period T required by the GPU for completing j target rendering processes, and to determine a target performance parameter according to j and T.

The test result determining unit 40 is configured to determine a performance test result of the GPU according to the target performance parameter and a performance criterion parameter.

In some possible implementations, the performance parameter determining unit 30 is further configured to: determine whether the GPU supports a target special effect; when the GPU does not support the target special effect, determine a parameter $a*j/T$ as the target performance parameter, in which a is a penalty coefficient related to the target special effect, where a is greater than 0 and less than 1; and when the GPU supports the target special effect, determine a parameter $j/T$ as the target performance parameter.

Figure 4:
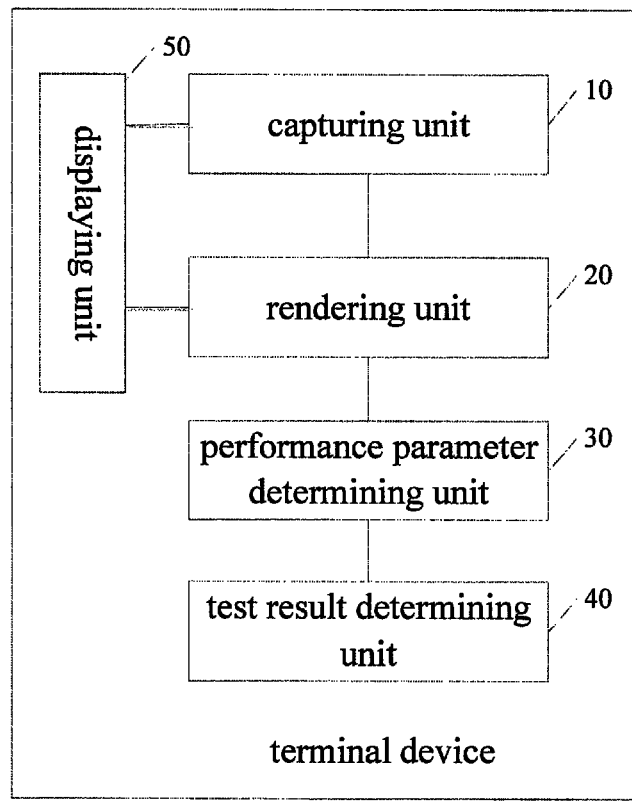
FIG. 4 is a block diagram of a terminal device for testing performance of GPU according to another embodiment of the present disclosure.

In some possible implementations, referring to FIG. 4, FIG. 4 is a block diagram of a terminal device for testing performance of GPU according to another embodiment of the present disclosure. The terminal device further includes a displaying unit 50.

The displaying unit 50 is configured to: extract an off-screen camera in the 3D scene model, and initialize the off-screen camera according to a predetermined off-screen map; determine whether i which is obtained by the rendering unit 20 is equal to $N*k$, where k is a positive integer and N is a positive integer; when i is equal to $N*k$ and a time interval between latest displaying time T' and time t1 when the GPU completes $N*k$ target rendering processes is greater than a predetermined time interval, display a drawn off-screen map on a user interface, set current time as t3, and update the latest displaying time T' as t3, wherein T' represents the latest time when the drawn off-screen map is displayed on the user interface before the time t1; and when i is not equal to $N*k$, drive the rendering unit to perform the step of moving.

In some possible implementations, the displaying unit 50 is further configured to: after the target image is obtained by the rendering unit 20 by means of the target rendering process, draw the target image onto the predetermined off-screen map to obtain the drawn off-screen map; and display the drawn off-screen map on the user interface by the initialized off-screen camera.

In some possible implementations, before the capturing unit 10 captures the target scene from the 3D scene model by the main camera in the 3D scene model, a 3D scene is required to be obtained in advance. In one embodiment, the capturing unit 10 can use a game engine such as Unity 3D to actively establish and edit the 3D scene model which can be used in a subsequent GPU performance test. In one embodiment, the capturing unit 10 may also obtain an established 3D scene model from a predetermined 3D model library. After the capturing unit 10 obtains the 3D scene model, the main camera can be extracted from the 3D scene model. The main camera can capture a part of 3D scene from the 3D scene model as the target scene with a predetermined cone of vision. After capturing unit 10 extracts the main camera, the main camera is initialized using predetermined camera configuration parameters. For example, a target texture of the main camera is set as a texture type determined in the predetermined camera configuration parameters. After the capturing unit 10 initializes the main camera, the target scene can be captured from the 3D scene model by the main camera. Then, the capturing unit 10 may list the target object included in the target scene. The target object includes a script object, a particle system object, an animation object and a navigation data object included in the target scene. There may be one or more script objects. Each script object includes functions such as FixedUpdate, Update or the like. Each functions may be used to realize a sub process corresponding to the function in the target rendering process.

After the capturing unit 10 obtains the target object, the rendering unit 20 obtains the plurality of script objects included in the target scene and then determines an execution sequence of a plurality of functions included in each script object. For example, the rendering unit 20 may execute the Update function after the FixedUpdate function in each script object is executed. After the rendering unit 20 determines the execution sequence of the plurality of functions in each script object, each function is executed, and the particle system object, the animation object and the navigation data object are invoked, such that the target rendering process can be determined.

After the rendering unit 20 determines the target rendering process, the GPU is driven to render the target scene onto the target map by means of the target rendering process. In detail, the rendering unit 20 may drive the GPU to determine an effect of a predetermined light source in the target scene on an object. The GPU may specify shadow setting for the object by using Depth Map Shadow method or Ray Tracing Shadow method. Then, the GPU needs to determine a surface color of the object according to material of the object. At last, the GPU determines effects corresponding to the particle system object and animation object included in the target object, and draws 2D image onto the target map to obtain the target image corresponding to the target scene.

After the rendering unit 20 drives the GPU to obtain the target image, the rendering execution number i is incremented by 1.

After the rendering unit 20 drives the GPU to complete the target rendering process, the displaying unit 50 may determine whether current test state meets the displaying condition. In detail, the displaying unit 50 extracts the off-screen camera in the 3D scene model, and initializes the off-screen camera according to a predetermined off-screen map. Then, the displaying unit 50 may determine whether the rendering execution number i is equal to N*k, where k is a positive integer and N is a positive integer. When the displaying unit 50 determines that i is equal to N*k, it may be determined whether a time interval between the latest displaying time and time t1 when the GPU completes N*k target rendering processes is greater than a predetermined time interval, if the result from the displaying unit 50 is positive, the target image obtained by the rendering unit 20 is drawn onto the off-screen map to obtained a drawn off-screen map. In one embodiment, the displaying unit 50 may divide the off-screen map into K sub maps. After the target image is obtained by the rendering unit 20, the target image is drawn onto target sub maps in the K sub maps according to a present order to obtain the drawn off-screen map. At last, displaying unit 50 displays the drawn off-screen map onto a user interface of the terminal device by the initialized off-screen camera. Meanwhile, the current time is set as t3 and the latest displaying time T' is updated as t3. Then displaying unit 50 executes determining whether i is equal to j. T' represents the latest time when a drawn off-screen map is displayed on a user interface before the time t1. When the displaying unit 50 determines that i is less than N*k, the displaying unit 50 determines whether i is equal to j.

When the rendering unit 20 determines that the rendering execution number i is less than j, the main camera in the 3D scene model is moved according to the navigation data object included in the scene object. Then the capturing unit 10 uses the moved main camera to capture a new scene from the 3D scene model and updates the target scene using the new scene. In one embodiment, a fixed time threshold can be set by the rendering unit 20, once the fixed time threshold is met, the main camera in the 3D scene model is moved by the rendering unit 20 such that the capturing unit 10 may update the target scene. By moving the main camera at fixed time intervals, when the performance test is for different GPUs, the different GPUs may render the same target scene, such that different GPUs may be tested under the same testing environment. After the capturing unit 10 updates the target scene, the subsequent operations described above are executed.

When the rendering unit 20 determines that i is equal to j, the time period T required by the GPU for completing j target rendering processes is obtained by the performance parameter determining unit 30. The time period T indicates a time interval from initial time t0 when the GPU is driven by the rendering unit 20 to execute $1^{st}$ target rendering process to time t3 when the GPU completes j target rendering processes. After the performance parameter determining unit 30 obtains the time period T, a parameter j/T may be determined as the target performance parameter of the GPU. In one embodiment, after the performance parameter determining unit 30 obtains the time period T, the performance parameter determining unit 30 may detect whether the GPU supports a predetermined special effect. The predetermined special effect includes Fog special effect, DOF special effect or SSAO special effect, which is not limited herein. When the performance parameter determining unit 30 determines that the GPU supports the predetermined special effect, the parameter j/T may be determined as the target performance parameter of the GPU. When the performance parameter determining unit 30 determines that the GPU does not support the predetermined special effect, a parameter a*j/T may be determined as the target performance parameter of the GPU, where a represents a penalty coefficient corresponding to the predetermined special effect. The penalty coefficient is obtained by performing several performance tests on the current dominant GPU, and is a ratio of a performance parameter b with the predetermined special effect to a performance parameter c without the predetermined special effect, i.e., a=b/c.

After the performance parameter determining unit 30 determines the target performance parameter of the GPU, a predetermined performance criterion parameter is obtained by the test result determining unit 40. The performance criterion parameter may be performance criterion empirical value obtained through many times of GPU performance tests. When the test result determining unit 40 determines that the target performance parameter obtained by the performance parameter determining unit 30 is less than the performance criterion parameter, it can be determined that the GPU has low performance. When the test result determining unit 40 determines that the target performance parameter is greater than or equal to the performance criterion parameter, it can be determined that the GPU has high performance.

In embodiments of the present disclosure, a target scene is captured from a 3D scene model by a main camera in the 3D scene model and a target object is extracted from the target scene. The target scene is selected from scenes included in the 3D scene model. The target object is selected from objects included in the target scene captured by the main camera. An execution sequence of a plurality of functions included in a script object of the target object is determined and a target rendering process is determined according to the execution sequence. The plurality of functions correspond respectively to sub processes in the target rendering process. The target scene is rendered onto a target map by means of the target rendering process to obtain a target image corresponding to the target scene, and a rendering execution number i is incremented by 1 once the target rendering process is completed by the GPU. The main camera is moved. Then, the steps of capturing, extracting, determining, driving, rendering and incrementing are iterated until i is equal to a predetermined threshold j. When i is equal to the predetermined threshold j, the time period T required by the GPU for completing j target rendering processes is obtained, and a target performance parameter is determined according to j and T. A performance test result of the GPU is determined according to the target performance parameter and a performance criterion parameter. With the embodiments of the present disclosure, the precision of method for testing performance of GPU can be improved, and the applicability of method for testing performance of GPU can be enhanced.

Figure 5:
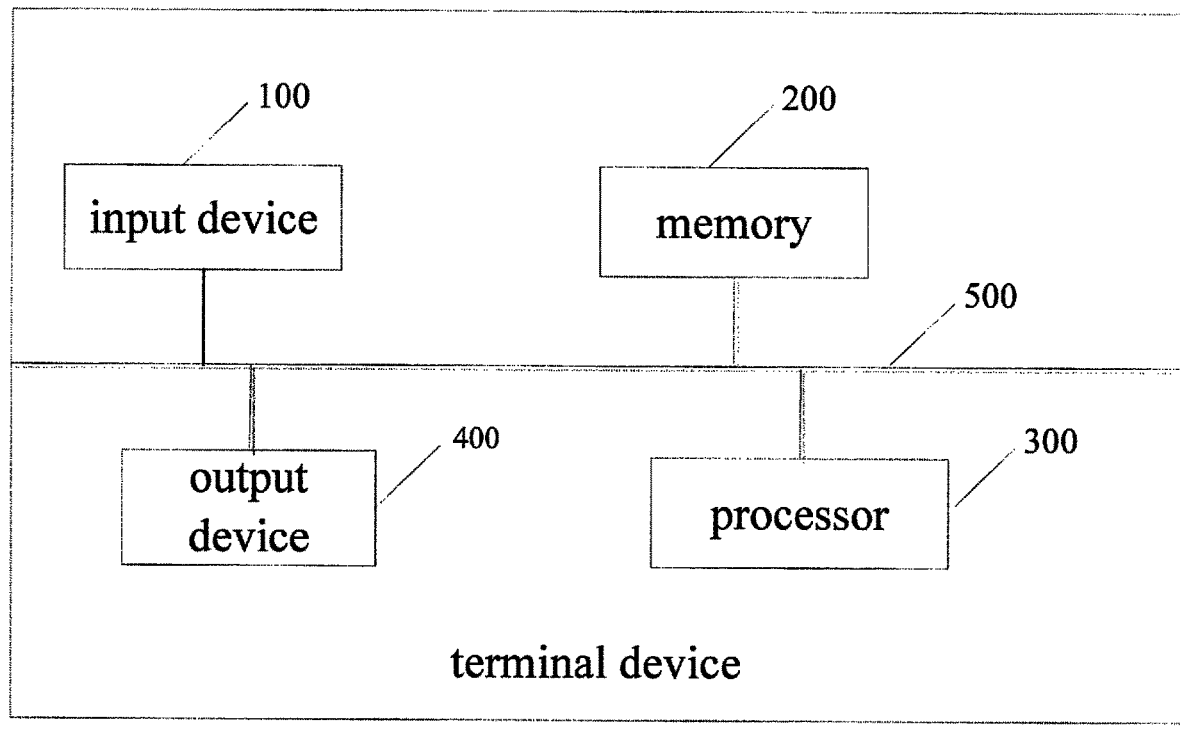
FIG. 5 is a block diagram of a terminal device for testing performance of GPU according to a further embodiment of the present disclosure.

Referring to FIG. 5, FIG. 5 is a block diagram of a terminal device for testing performance of GPU according to a further embodiment of the present disclosure. As illustrated in FIG. 5, the terminal device may include: one or more input devices 100, a memory 200, one or more processors 300 and one or more output devices 400. The one or more processors 300, the one or more input devices 100, the one or more output devices 400 and the memory 200 are connected via bus 500. The memory 200 is configured to store computer programs. The computer programs include program instructions. The one or more processors 300 are configured to execute the program instructions stored in the memory 200. The one or more processors 300 are configured to invoke the program instructions to perform: capturing a target scene from a 3D scene model by a main camera in the 3D scene model and extracting a target object from the target scene, in which the target scene is selected from scenes included in the 3D scene model; determining an execution sequence of a plurality of functions included in a script object of the target object and determining a target rendering process according to the execution sequence, in which the plurality of functions correspond respectively to sub processes in the target rendering process; driving the GPU to execute the target rendering process, rendering the target scene onto a target map by means of the target rendering process to obtain a target image corresponding to the target scene, and incrementing a rendering execution number i by 1 once the target rendering process is completed by the GPU, in which an initial value of i is 0; moving the main camera, and iterating steps of capturing, extracting, determining, driving, rendering and incrementing until i is equal to a predetermined threshold j, where j is an integer greater than 1; when i is equal to the predetermined threshold j, obtaining a time period T required by the GPU for completing j target rendering processes, and determining a target performance parameter according to j and T; and determining a performance test result of the GPU according to the target performance parameter and a performance criterion parameter.

It should be understood that, in embodiments of the present disclosure, the one or more processors 300 may include a central processing unit (CPU) or other general processors, a digital signal processor (DSP), an application specific integrated circuit (ASIC), a field programmable gate array (FPGA), or other programmable logic elements, a discrete gate or a transistor logic element, a discrete hardware component or the like. The general processor may be a micro processor. The processor may also be any common processor.

The one or more input devices 100 may include a touch panel, a fingerprint sensor (collecting fingerprint information and direction information of the fingerprint), a microphone or the like. The one or more output devices 400 may include a display (such as LCD), a speaker or the like.

The memory 200 may include a read-only memory and a random access memory, and provides instructions and data for the one or more processors 300. A part of the memory 200 may include a nonvolatile random access memory. For example, the memory 200 may also store information on types of devices.

In practice, the one or more processors 300, the one or more input devices 100, the one or more output devices 200 described in embodiments of the present disclosure may perform the method for testing performance of GPU according to the first embodiment and the second embodiment of the present disclosure or may be implement the terminal device according to embodiments of the present disclosure, which are not described herein.

Another embodiment of the present disclosure provides a computer readable storage medium having computer programs stored therein. The computer programs include program instructions, that when executed by a processor, the following operations are performed: capturing a target scene from a 3D scene model by a main camera in the 3D scene model and extracting a target object from the target scene, in which the target scene is selected from scenes included in the 3D scene model and the target object is selected from objects included in the target scene; determining an execution sequence of a plurality of functions included in a script object of the target object and determining a target rendering process according to the execution sequence, in which the plurality of functions correspond respectively to sub processes in the target rendering process; driving the GPU to execute the target rendering process, rendering the target scene onto a target map by means of the target rendering process to obtain a target image corresponding to the target scene, and incrementing a rendering execution number i by 1 once the target rendering process is completed by the GPU, in which an initial value of i is 0; moving the main camera, and iterating steps of capturing, extracting, determining, driving, rendering and incrementing until i is equal to a predetermined threshold j, where j is an integer greater than 1; when i is equal to the predetermined threshold j, obtaining a time period T required by the GPU for completing j target rendering processes, and determining a target performance parameter according to j and T; and determining a performance test result of the GPU according to the target performance parameter and a performance criterion parameter.

The computer readable storage medium may be an internal storage unit in the terminal device described in any of the above embodiments, for example, a disk or memory of the terminal device. The computer readable storage medium may also be an external storage device of the terminal device, for example a plugged disk, a smart media card (SMC), a secure digital (SD) card, a flash card provided on the terminal device, or the like. The computer readable storage medium may not only include the internal storage unit but also include the external storage device. The computer readable storage medium is configured to store the computer programs and other programs and data required by the terminal device. The computer readable storage medium may be configured to store outputted data or data to be outputted temporally.

Those skilled in the art may be aware that, in combination with the examples described in the embodiments disclosed in this specification, units and algorithm steps can be implemented by electronic hardware, or a combination of computer software and electronic hardware. In order to clearly illustrate interchangeability of the hardware and software, components and steps of each example are already described in the description according to the function commonalities. Whether the functions are executed by hardware or software depends on particular applications and design constraint conditions of the technical solutions. Persons skilled in the art may use different methods to implement the described functions for each particular application, but it should not be considered that the implementation goes beyond the scope of the present invention.

Those skilled in the art may be aware that, for convenience and ease of the description, regarding the detailed working processes of the terminal device and units, reference can be made to the corresponding descriptions in method embodiments, which are not described herein.

In embodiments provided in the present disclosure, it may be understood that, the disclosed system, device and method may be realized through other manners. For example, device embodiments described above are merely schematically. For example, a division of modules or units is a logic functional division. In practice, other division manners may be utilized. For example, a plurality of units or components may be combined or integrated into another system, or some feature may be omitted or not executed. For another point, coupling or direct coupling or communicational connections shown or discussed herein are realized through some interfaces. Indirect coupling or communicational connections between devices or units may be electrically, mechanically or in other forms.

The above units described as separated parts may be or may be not physically separated. Parts displayed as units may be or may be not physical units, and they may be located at same position or may be distributed to a plurality of network units. A part of or all of units may be selected according to actual requirements to realize solutions of embodiments of the present disclosure.

In addition, each function cell of the embodiments of the present disclosure may be integrated in a processing module, or these cells may be separate physical existence, or two or more cells are integrated in a processing module. The integrated module may be realized in a form of hardware or in a form of software function modules.

When the integrated module is realized in a form of software function module and is sold or used as a standalone product, the integrated module may be stored in a computer readable storage medium. Based on this understanding, a part of or all of technical solutions of the present disclosure essentially contributing to the prior art, or a part of or all of the technical solutions may be embodied in a form of a software product. The computer software product may be stored in a storage medium including several instructions such that a computer device (may be a personal computer, a server, a network device or the like), or a processor executes all of or a part of blocks of the method provided in embodiments of the present disclosure. The storage medium may include: a USB drive, a mobile hard disk drive, Read-Only Memory (ROM), Random Access Memory (RAM) a magnetic tapes, Compact Disc, and various medium that may store program instructions.

The above embodiments are merely to describe technical solutions of the present disclosure, but not to limit the present disclosure. Changes and alternatives made by those skilled in the art within a technical scope disclosed by the present disclosure should be covered in a protective scope of the present disclosure. Therefore, the protective scope of the present disclosure is determined according to the protective scope of pending claims.

What is claimed is:

1. A method for testing performance of a graphics processing unit (GPU), comprising:
    capturing a target scene from a 3D scene model by a main camera in the 3D scene model and extracting a target object from the target scene, wherein the target scene is selected from scenes included in the 3D scene model;
    determining an execution sequence of a plurality of functions included in a script object of the target object and determining a target rendering process according to the execution sequence, wherein the plurality of functions correspond respectively to sub processes in the target rendering process;
    driving the GPU to execute the target rendering process, rendering the target scene onto a target map by means of the target rendering process to obtain a target image corresponding to the target scene, and incrementing a rendering execution number i by 1 once the target rendering process is completed by the GPU, wherein an initial value of i is 0;
    moving the main camera, and iterating steps of capturing, extracting, determining, driving, rendering and incrementing until i is equal to a predetermined threshold j, where j is an integer greater than 1;
    when i is equal to the predetermined threshold j, obtaining a time period T required by the GPU for completing j target rendering processes, and determining a parameter $a*j/T$ as a target performance parameter according to j and T, wherein a is a penalty coefficient related to a target special effect; and
    determining a performance test result of the GPU according to the target performance parameter and a performance criterion parameter.

2. The method according to claim 1, wherein determining the target performance parameter according to j and T comprises:
    determining whether the GPU supports the target special effect;
    when the GPU does not support the target special effect the penalty coefficient is a ratio of a performance parameter b with a predetermined special effect to a performance parameter c without the predetermined special effect, where a is greater than 0 and less than 1; and
    when the GPU supports the target special effect, determining a parameter $j/T$ as the target performance parameter.

3. The method according to claim 1, wherein before moving the main camera, the method further comprises:
    extracting an off-screen camera in the 3D scene model, and initializing the off-screen camera according to a predetermined off-screen map;
    determining whether i is equal to N*k, where k is a positive integer and N is a positive integer;
    when i is equal to N*k and a time interval between latest displaying time T' and time t1 when the GPU completes N*k target rendering processes is greater than a predetermined time interval, displaying the target image by the initialized off-screen camera, setting current time as t3, and updating the latest displaying time T' as t3, wherein T' represents the latest time when a drawn off-screen map is displayed on a user interface before the time t1; and
    when i is not equal to N*k, performing the step of moving.

4. The method according to claim 2, wherein before moving the main camera, the method further comprises:
    extracting an off-screen camera in the 3D scene model, and initializing the off-screen camera according to a predetermined off-screen map;
    determining whether i is equal to N*k, where k is a positive integer and N is a positive integer;
    when i is equal to N*k and a time interval between latest displaying time T' and time t1 when the GPU completes N*k target rendering processes is greater than a predetermined time interval, displaying the target image by the initialized off-screen camera, setting current time as t3, and updating the latest displaying time T' as t3, wherein T' represents the latest time when a drawn off-screen map is displayed on a user interface before the time t1; and when i is not equal to N*k, performing the step of moving.

5. The method according to claim 3, wherein displaying the target image by the initialized off-screen camera comprises:

drawing the target image onto the predetermined off-screen map to obtain the drawn off-screen map; and displaying the drawn off-screen map on the user interface by the initialized off-screen camera.

6. The method according to claim 4, wherein displaying the target image by the initialized off-screen camera comprises:

drawing the target image onto the predetermined off-screen map to obtain the drawn off-screen map; and displaying the drawn off-screen map on the user interface by the initialized off-screen camera.

7. The method according to claim 1, wherein driving the GPU to execute the target rendering process, rendering the target scene onto a target map by means of the target rendering process to obtain a target image corresponding to the target scene comprises:

driving the GPU to determine effect of a light source in the target scene on the target object;

specifying by the GPU a shadow setting of the target object by a using Depth Map Shadow method or a Ray Tracing Shadow method;

determining by the GPU a surface color of the target object according to material of the target object; and determine by the GPU effects corresponding to a particle system object and an animation object included in the target object, and drawing 2D image onto the target map to obtain the target image corresponding to the target scene.

8. The method according to claim 1, wherein determining a performance test result of the GPU according to the target performance parameter and a performance criterion parameter comprises:

when the target performance parameter is greater than or equal to the performance criterion parameter, determining the GPU has a first performance; and when the target performance parameter is less than the performance criterion parameter, determining the GPU has a second performance;

wherein the first performance is better than the second performance.

9. A terminal device, comprising a processor, an input device, an output device and a memory, wherein, the processor, the input device, the output device and the memory are coupled to each other; the memory is configured to a computer program including program commands; and the processor is configured to invoke the program commands to perform:

capturing a target scene from a 3D scene model by a main camera in the 3D scene model and extracting a target object from the target scene, wherein the target scene is selected from scenes included in the 3D scene model;

determining an execution sequence of a plurality of functions included in a script object of the target object and determining a target rendering process according to the execution sequence, wherein the plurality of functions correspond respectively to sub processes in the target rendering process;

driving the GPU to execute the target rendering process, rendering the target scene onto a target map by means of the target rendering process to obtain a target image corresponding to the target scene, and incrementing a rendering execution number i by 1 once the target rendering process is completed by the GPU, wherein an initial value of i is 0;

moving the main camera, and iterating steps of capturing, extracting, determining, driving, rendering and incrementing until i is equal to a predetermined threshold j, where j is an integer greater than 1;

when i is equal to the predetermined threshold j, obtaining a time period T required by the GPU for completing j target rendering processes, and determining a parameter a*j/T as a target performance parameter according to j and T, wherein a is a penalty coefficient related to a target special effect; and determining a performance test result of the GPU according to the target performance parameter and a performance criterion parameter.

10. The terminal device according to claim 9, wherein determining the target performance parameter according to j and T comprises:

determining whether the GPU supports the target special effect;

when the GPU does not support the target special effect the penalty coefficient is a ratio of a performance parameter b with a predetermined special effect to a performance parameter c without the predetermined special effect, where a is greater than 0 and less than 1; and when the GPU supports the target special effect, determining a parameter j/T as the target performance parameter.

11. The terminal device according to claim 9, wherein the processor is further configured to invoke the program commands to perform:

extracting an off-screen camera in the 3D scene model, and initializing the off-screen camera according to a predetermined off-screen map;

determining whether i is equal to N*k, where k is a positive integer and N is a positive integer;

when i is equal to N*k and a time interval between latest displaying time T' and time t1 when the GPU completes N*k target rendering processes is greater than a predetermined time interval, displaying the target image by the initialized off-screen camera, setting current time as t3, and updating the latest displaying time T' as t3, wherein T' represents the latest time when a drawn off-screen map is displayed on a user interface before the time t1; and when i is not equal to N*k, performing the step of moving.

12. The terminal device according to claim 10, wherein the processor is further configured to invoke the program commands to perform:

extracting an off-screen camera in the 3D scene model, and initializing the off-screen camera according to a predetermined off-screen map;

determining whether i is equal to N*k, where k is a positive integer and N is a positive integer;

when i is equal to N*k and a time interval between latest displaying time T' and time t1 when the GPU completes N*k target rendering processes is greater than a predetermined time interval, displaying the target image by the initialized off-screen camera, setting current time as t3, and updating the latest displaying time T' as t3, wherein T' represents the latest time when a drawn off-screen map is displayed on a user interface before the time t1; and when i is not equal to N*k, performing the step of moving.

13. The terminal device according to claim 11, wherein displaying the target image by the initialized off-screen camera comprises:

drawing the target image onto the predetermined off-screen map to obtain the drawn off-screen map; and displaying the drawn off-screen map on the user interface by the initialized off-screen camera.

14. The terminal device according to claim 12, wherein displaying the target image by the initialized off-screen camera comprises:

drawing the target image onto the predetermined off-screen map to obtain the drawn off-screen map; and displaying the drawn off-screen map on the user interface by the initialized off-screen camera.

15. The terminal device according to claim 9, wherein driving the GPU to execute the target rendering process, rendering the target scene onto a target map by means of the target rendering process to obtain a target image corresponding to the target scene comprises:

driving the GPU to determine effect of a light source in the target scene on the target object;

specifying by the GPU a shadow setting of the target object by a using Depth Map Shadow method or a Ray Tracing Shadow method;

determining by the GPU a surface color of the target object according to material of the target object; and determine by the GPU effects corresponding to a particle system object and an animation object included in the target object, and drawing 2D image onto the target map to obtain the target image corresponding to the target scene.

16. The terminal device according to claim 9, wherein determining a performance test result of the GPU according to the target performance parameter and a performance criterion parameter comprises:

when the target performance parameter is greater than or equal to the performance criterion parameter, determining the GPU has a first performance; and when the target performance parameter is less than the performance criterion parameter, determining the GPU has a second performance;

wherein the first performance is better than the second performance.

17. A non-transitory computer-readable storage medium having stored therein a computer program comprising program commands that, when executed by a processor of a device, causes the processor to perform:

capturing a target scene from a 3D scene model by a main camera in the 3D scene model and extracting a target object from the target scene, wherein the target scene is selected from scenes included in the 3D scene model;

determining an execution sequence of a plurality of functions included in a script object of the target object and determining a target rendering process according to the execution sequence, wherein the plurality of functions correspond respectively to sub processes in the target rendering process;

driving the GPU to execute the target rendering process, rendering the target scene onto a target map by means of the target rendering process to obtain a target image corresponding to the target scene, and incrementing a rendering execution number i by 1 once the target rendering process is completed by the GPU, wherein an initial value of i is 0;

moving the main camera, and iterating steps of capturing, extracting, determining, driving, rendering and incrementing until i is equal to a predetermined threshold j, where j is an integer greater than 1;

when i is equal to the predetermined threshold j, obtaining a time period T required by the GPU for completing j target rendering processes, and determining a parameter a*j/T as a target performance parameter according to j and T, wherein a is a penalty coefficient related to a target special effect; and determining a performance test result of the GPU according to the target performance parameter and a performance criterion parameter.

18. The processor according to claim 17, wherein determining the target performance parameter according to j and T comprises:

determining whether the GPU supports the target special effect;

when the GPU does not support the target special effect the penalty coefficient is a ratio of a performance parameter b with a predetermined special effect to a performance parameter c without the predetermined special effect, where a is greater than 0 and less than 1; and when the GPU supports the target special effect, determining a parameter j/T as the target performance parameter.

19. The processor according to claim 17, wherein before moving the main camera, the processor is further configured to perform:

extracting an off-screen camera in the 3D scene model, and initializing the off-screen camera according to a predetermined off-screen map;

determining whether i is equal to N*k, where k is a positive integer and N is a positive integer;

when i is equal to N*k and a time interval between latest displaying time T' and time t1 when the GPU completes N*k target rendering processes is greater than a predetermined time interval, displaying the target image by the initialized off-screen camera, setting current time as t3, and updating the latest displaying time T' as t3, wherein T' represents the latest time when a drawn off-screen map is displayed on a user interface before the time t1; and when i is not equal to N*k, performing the step of moving.

20. The processor according to claim 19, wherein displaying the target image by the initialized off-screen camera comprises:

drawing the target image onto the predetermined off-screen map to obtain the drawn off-screen map; and displaying the drawn off-screen map on the user interface by the initialized off-screen camera.

* * * * *